United States Patent
Chen

(10) Patent No.: US 10,197,046 B2
(45) Date of Patent: Feb. 5, 2019

(54) SOLAR POWER SYSTEM

(71) Applicant: Huang-Han Chen, New Taipei (TW)

(72) Inventor: Huang-Han Chen, New Taipei (TW)

(*) Notice: Subject to any disclaimer, the term of this patent is extended or adjusted under 35 U.S.C. 154(b) by 77 days.

(21) Appl. No.: 15/296,253

(22) Filed: Oct. 18, 2016

(65) Prior Publication Data
US 2017/0037834 A1 Feb. 9, 2017

Related U.S. Application Data

(63) Continuation-in-part of application No. 13/746,510, filed on Jan. 22, 2013, now abandoned.

(51) Int. Cl.
| | |
|---|---|
| *F03G 6/06* | (2006.01) |
| *F28F 3/12* | (2006.01) |
| *F28F 3/02* | (2006.01) |
| *F28F 3/04* | (2006.01) |
| *F28F 3/08* | (2006.01) |
| *F28F 13/12* | (2006.01) |
| *F28D 9/00* | (2006.01) |
| *F24S 20/20* | (2018.01) |

(Continued)

(52) U.S. Cl.
CPC ............. *F03G 6/067* (2013.01); *F03G 6/06* (2013.01); *F03G 6/065* (2013.01); *F24S 10/30* (2018.05); *F24S 20/20* (2018.05); *F28D 9/0075* (2013.01); *F28F 3/02* (2013.01); *F28F 3/025* (2013.01); *F28F 3/04* (2013.01); *F28F 3/086* (2013.01); *F28F 3/12* (2013.01); *F28F 13/12* (2013.01); *F24S 2023/872* (2018.05); *Y02E 10/40* (2013.01); *Y02E 10/41* (2013.01); *Y02E 10/44* (2013.01); *Y02E 10/46* (2013.01); *Y10S 165/36* (2013.01); *Y10S 165/364* (2013.01); *Y10T 29/49366* (2015.01)

(58) Field of Classification Search
CPC ...... F28F 3/12; F28F 13/12; F28F 3/04; F28F 3/086; F28F 3/02; F28F 3/025; F28F 3/083; F03G 6/067; F03G 6/065; F03G 6/06; F24J 2/30; F24J 2/07; F28D 9/0075; Y02E 10/46; Y02E 10/44; Y02E 10/40; Y10S 165/364; Y10S 165/36; Y10T 29/49366
See application file for complete search history.

(56) References Cited

U.S. PATENT DOCUMENTS

| | | | | |
|---|---|---|---|---|
| 4,880,055 A | * | 11/1989 | Niggemann | F28F 3/086 165/167 |
| 5,193,611 A | * | 3/1993 | Hesselgreaves | F28F 3/02 165/165 |

(Continued)

*Primary Examiner* — Mark A Laurenzi
*Assistant Examiner* — Wesley G Harris
(74) *Attorney, Agent, or Firm* — Ming Chow; Sinorica, LLC

(57) ABSTRACT

A solar power system having a heat exchanger, a heat-focusing mirror used to receive sunlight, a turbine generator, and a battery coupled to the turbine generator is provided. The heat exchanger has a first guiding channel for a first heat-exchange fluid and a second guiding channel for a second heat-exchange fluid. Sunlight is focused to the first heat-exchange fluid flow in the first guiding channel by the heat-focusing mirror. One end of the turbine generator is communicated with the outlet of the second guiding channel. The second heat-exchange fluid is suitable for driving the turbine generator to produce an electric power, and the electric power can be stored into the battery.

10 Claims, 8 Drawing Sheets

(51) Int. Cl.
*F24S 10/30* (2018.01)
*F24S 23/70* (2018.01)

(56) References Cited

U.S. PATENT DOCUMENTS 5,836,383 A * 11/1998 Zwittig ................ F28D 1/0375
165/167
7,017,655 B2 * 3/2006 Wilson ................ F28D 15/0266
165/80.4

* cited by examiner

SOLAR POWER SYSTEM

This application is a continuation-in-part of application Ser. No. 13/746,510 filed on Jan. 22, 2013.

BACKGROUND OF THE INVENTION

Field of the Invention

The invention relates to a power system. More particularly, the invention relates to a solar power system that converting sunlight to power generation.

Description of Related Art

In recent years, petrochemical energy gradually dried up, and the petrochemical energy will cause the Earth environmental pollution increasingly serious, and therefore, the utilization of natural energy or renewable energy has become importantly.

Therefore, many experts have begun to study a variety of renewable energy applications, wherein solar energy is the most viable natural energy. Under the current power has increasingly widespread use of solar power converting device, the urgent needs in shortage of the exhaustible energy and environmental consciousness gradually, the use of solar power converting devices is increasingly important. But, poor photoelectric converting efficiency of solar power generation system, such as U.S. Pat. No. 5,462,112. The U.S. Pat. No. 5,462,112 could not provide the power effectively.

SUMMARY OF THE INVENTION

The invention is directed to a solar power system having a heat exchanger that increases the contacting area between the fins and heat exchanging fluid substantially, and results in heat exchange operation efficiently, thereby greatly enhance the photoelectric converting efficiency of the solar power system.

In the invention, a solar power system is provided. The solar power system is suitable for converting sunlight to an electric power. The solar power system includes a heat exchanger, a heat-focusing mirror, a turbine generator, and a battery. The heat exchanger includes at least a first fin and at least a second fin.

Each first fin has a first body, multiple first heat-exchange structures, and multiple first connecting structures, the first heat-exchange structures and the first connecting structures are configured with interval in the first body along a disposing axis, each first heat-exchange structure has multiple first heat-exchange units arranged in the first body along a connecting axis, each first connecting structure has multiple first connecting units arranged in the first body along the connecting axis.

Each second fin has a second body, multiple second heat-exchange structures and multiple second connecting structures, the second heat-exchange structures and the second connecting structures are configured with interval in the second body along the disposing axis, each second heat-exchange structure has multiple second heat-exchange units arranged in the second body along the connecting axis, each second connecting structure has multiple second connecting units arranged in the second body along the connecting axis.

Wherein, each first fin and each second fin are connected along a assembly axis, the second connecting units are communicated with the first heat-exchange units, the first connecting units are communicated with the second heat-exchange units.

Wherein, the first heat-exchange unit of each first heat-exchange structure is staggered with an adjacent first heat-exchange unit, the first connecting unit of each first connecting structure is staggered with an adjacent connecting unit, the second heat-exchange unit of each second heat-exchange structure is staggered with an adjacent second heat-exchange unit, the second connecting unit of each second connecting structure is staggered with an adjacent second connecting unit.

Wherein, the first heat-exchange structures and the second connecting structures constitute a first guiding channel, the second heat-exchange structures and the first connecting structures constitute a second guiding channel.

Wherein, a first heat-exchange fluid flows in the first guiding channel, a second heat-exchange fluid flows in the second guiding channel.

Wherein, the first heat-exchange units are arranged adjacently without communicating, and the first connecting units are arranged adjacently without communicating. When the first fins and the second fins are contacted along the assembly axis, the first heat-exchange units are communicated by the second connecting units.

Wherein, the second heat-exchange units are arranged adjacently without communicating, the second connecting units are arranged adjacently without communicating. When the first fins and the second fins are contacted along the assembly axis, the second heat-exchange units are communicated by the first connecting units.

The heat-focusing mirror is suitable for receiving sunlight, and focusing to the first heat-exchange fluid flowed in the first guiding channel by light reflection or refraction. One end of the turbine generator is communicated with the outlet of the second guiding channel. The second heat-exchange fluid is suitable for driving the turbine generator to produce a electric power. The battery is connected to the turbine generator, and the electric power is stored in the battery.

In one embodiment of the present invention, one end of the second connecting unit of the second fin is overlapped with one end of the first heat-exchange unit of the adjacent first fin, the other end of the second connecting unit is overlapped with one end of another first heat-exchange unit of the first fin, one end of the first connecting unit of the first fin is overlapped with one end of the second heat-exchange unit of the adjacent second fin, the other end of the first connecting unit is overlapped with one end of another second heat-exchange unit of the second fin.

In one embodiment of the present invention, two first heat-exchange units overlapped with the second connecting unit are arranged in the first body along the connecting axis, and two second heat-exchange units overlapped with the first connecting unit are arranged in the second body along the connecting axis.

In one embodiment of the present invention, the second connecting unit of the second fin is communicated with two adjacent first heat-exchange units of the first fin arranged along the disposing axis and two adjacent first heat-exchange units arranged along the connecting axis, the first connecting unit of the first fin is communicated with two adjacent second heat-exchange units of the second fin arranged along the disposing axis and two adjacent second heat-exchange units arranged along the connecting axis.

In one embodiment of the present invention, the first fin further includes a first mainstream channel and a second mainstream channel, and the second fin further includes a third mainstream channel and a fourth mainstream channel. Wherein, each first heat-exchange structure constitutes to a tributary channel connected with the first mainstream channel along the connecting axis, and each first connecting structure constitutes to another tributary channel connected with the second mainstream channel along the connecting axis. Wherein, each second heat-exchange structure constitutes to another tributary channel connected with the third mainstream channel along the connecting axis, and each second connecting structure constitutes to another tributary channel connected with the fourth mainstream channel along the connecting axis. Wherein, the first mainstream channel and the fourth mainstream channel are communicated with each other, the third mainstream channel and the second mainstream channel are communicated with each other.

In one embodiment of the present invention, a projection area of the second connecting structure in the first body is overlapped with the first heat-exchange structure, a projection area of the first connecting structure in the second body is overlapped with the second heat-exchange structure.

In one embodiment of the present invention, the first heat-exchange structures and the first connecting structures are embedded in the first body, the second heat-exchange structures and the second connecting structures are embedded in the second body.

In one embodiment of the present invention, the assembly of the first heat-exchange structures and the first mainstream channel and the assembly of the first connecting structures and the second mainstream channel are embedded in the first body, the assembly of the second heat-exchange structures and the third mainstream channel and the assembly of the second connecting structures and the fourth mainstream channel are embedded in the second body.

In one embodiment of the present invention, the heat exchanger further includes a third fin and a fourth fin, the third fin and the fourth fin are disposed in two sides of the assembly of the first fin and the second fin along the assembly axis respectively, the third fin has a first inlet structure and a first outlet structure, the fourth fin has a second inlet structure and a second the outlet structure, the first inlet structure and the first outlet structure are connected to two ends of the first guiding channel, the second inlet structure and the second outlet structure are connected to two ends of the second guiding channel, the first inlet structure is communicated with one end of the first heat-exchange structure, the first outlet structure is communicated with another end of the first heat-exchange structure, the second inlet structure is communicated with one end of the second heat-exchange structure, the second outlet structure is communicated with another end of the second heat-exchange structure.

In one embodiment of the present invention, the solar power system further includes a fifth fin and a sixth fin, the fifth fin and the sixth fin are disposed in two sides of the assembly of each first fin, each second fin, each third fin, and each fourth fin along the assembly axis respectively, the fifth fin has a first through hole and a second through hole, the sixth fin has a third through hole and a fourth through hole, one side of the first inlet structure is communicated with one end of the first heat-exchange structure, another side of the first inlet structure is communicated with the first through hole, one side of the first outlet structure is communicated with another end of the first heat-exchange structure, and another side of the first outlet structure is communicated with the second through hole, one side of the second inlet structure is communicated with one end of the second heat-exchange structure, and another side of the second inlet structure is communicated with the third through hole, one side of the second outlet structure is communicated with another end of the second heat-exchange structure, and another side of the second outlet structure is communicated with the fourth through hole.

In one embodiment of the present invention, the solar power system further includes a first heat-exchange fluid tank, a control valve, a second heat-exchange fluid tank, a flow-detecting controller, and a pump, wherein the first heat-exchange fluid is oil, the second heat-exchange fluid is water, the first heat-exchange fluid tank has a first heat-exchange fluid tank-inlet and a first heat-exchange fluid tank-outlet, the first heat-exchange fluid tank-inlet is communicated with the outlet of the first guiding channel, the first heat-exchange fluid tank-outlet is communicated with the inlet of the first guiding channel, the control valve is disposed between the outlet of the first guiding channel and the first heat-exchange fluid tank, the turbine generator is suitable for controlling a open state and a close state of the control valve, the second heat-exchange fluid tank is used to store the second heat-exchange fluid, and disposed between the turbine generator and the inlet of the second guiding channel, the flow-detecting controller is suitable for detecting the flow of the second heat-exchange fluid, when the flow of the second heat-exchange fluid is lower than a default value, the flow-detecting controller controls the second heat-exchange fluid tank to be the open state to process a supplement, the pump is used to drive the first heat-exchange fluid and the second heat-exchange fluid.

In one embodiment of the present invention, the heat-focusing mirror is a Fresnel solar mirror.

In one embodiment of the present invention, the turbine generator is a steam turbine generator.

As described in the embodiments of the invention, in the invention of the solar power system, at least two fins are set with multiple heat-exchange structures and connecting structures. In each fin, the heat-exchange structure is not communicated with the connecting structure. When the fins are assembled, the heat-exchange structures of each fin constitute a guiding channel by the connecting structure of another fin. Thus, the heat exchanger of the invention has two guiding channels to perform a heat-exchange process for the fluids with different temperatures.

In addition, since the heat exchanger of the invention is assembled by at least two types of fins staggered with each other and each fin has multiple heat-exchange structures and connecting structures, the heat-exchange fluid is forced to be confluent or separated constantly when The heat-exchange fluid flows into the heat exchanger. This increases the contact area between the heat-exchange fluid and heat exchanger substantially, and increases the rate of the heat-exchange process of heat-exchange fluids to achieve good heat-exchange performance. Therefore, the second heat-exchange fluid is, for example, water. The first heat-exchange fluid is, for example, oil. The second heat-exchange fluid can be vaporized into steam rapidly and efficiently when the first heat-exchange fluid is heated via sunlight by the heat exchanger of the invention. The steam is applied to drive the turbine generator to produce a electric energy, and the photoelectric conversion efficiency of the solar power system is upgraded substantially.

Other features and advantages of the invention will be further understood from the further technological features disclosed by the embodiments of the invention wherein there are shown and described embodiments of this invention, simply by way of illustration of best modes to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Other features and advantages of the invention will be further understood from the further technological features disclosed by the embodiments of the invention wherein there are shown and described embodiments of this invention, simply by way of illustration of best modes to carry out the invention.

Figure 1:
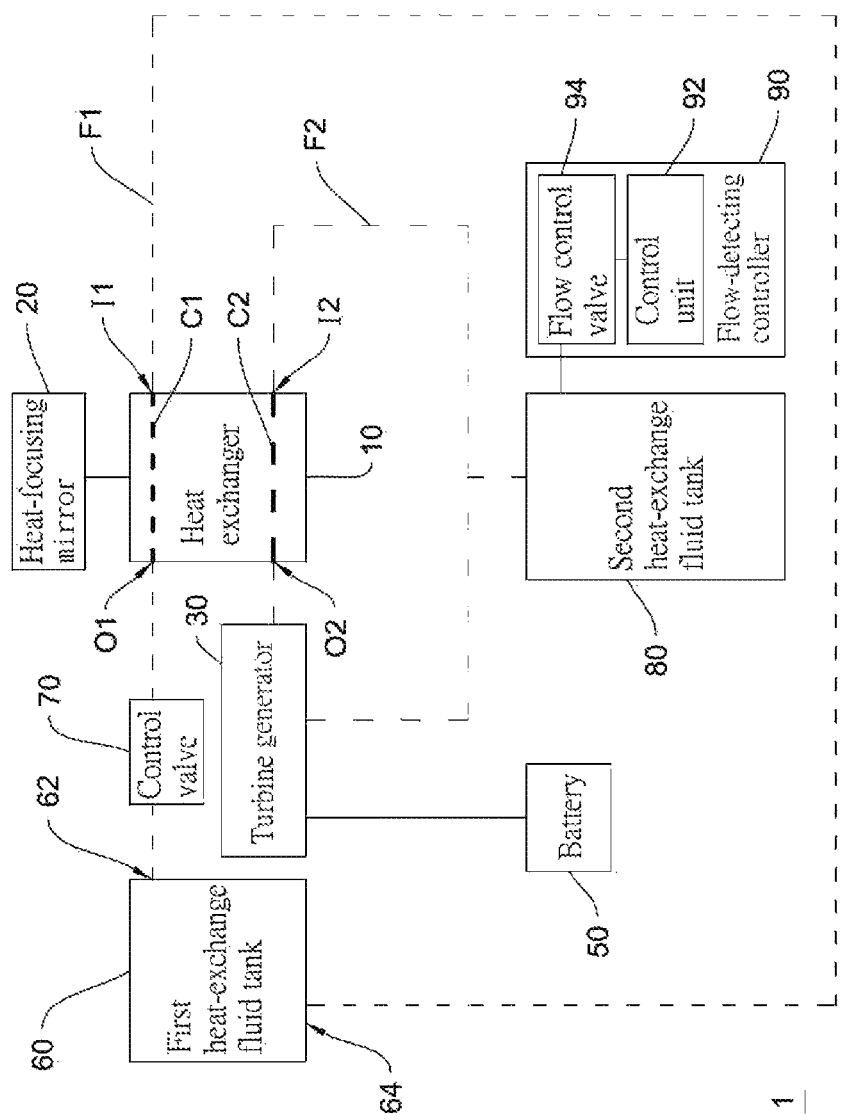
FIG. 1 is a schematic view illustrating the solar power system according to one embodiment of the present invention.

FIG. 1 is a schematic view illustrating the solar power system according to one embodiment of the present invention. Referring to FIG. 1, the solar power system 1 of the present embodiment is suitable for converting sunlight to an electric power. The solar power system includes a heat exchanger 10, a heat-focusing mirror 20, a turbine generator 30, and a battery 50. The heat exchanger 10 is set with a first guiding channel C1 and a second guiding channel C2 mainly. The first guiding channel C1 and other channel communicated therewith are capable of flowing for a first heat-exchange fluid F1 with higher temperature, for example. The second guiding channel C2 and other channel communicated therewith are capable of flowing for a second heat-exchange fluid F2 with lower temperature, for example. The first heat-exchange fluid F1 is, for example, oil or other appropriate fluids with higher boiling point. The second heat-exchange fluid F2 is, for example, water or other appropriate fluids with lower boiling point. The heat-focusing mirror 20 is, for example, a Fresnel solar mirror. The turbine generator 30 is, for example, a steam turbine generator. The turbine generator 30 is also suitable for transforming a mechanical energy into the electric power.

In the present embodiment, heat-focusing mirror 20 is suitable for receiving sunlight. Sunlight is focused to the first heat-exchange fluid F1 in the first guiding channel C1. Since the first heat-exchange fluid F1 is, for example, appropriate fluid with higher boiling point, like oil, the temperature of the first heat-exchange fluid F1 rises substantially (approximately 800 degrees Celsius) when the first heat-exchange fluid F1 be heated by sunlight. Besides, since the second heat-exchange fluid F2 is, for example, appropriate fluid with lower boiling point, like water, the temperature of the second heat-exchange fluid F2 in the second guiding channel C2 is normal (approximately 20 degrees Celsius). Therefore, the heat exchanger 10 of the invention has a good heat-exchange efficiency when the first heat-exchange fluid F1 and the second heat-exchange fluid F2 flows into the heat exchanger 10. In other words, the second heat-exchange fluid F2 is, for example, liquid. The second heat-exchange fluid F2 be heated and vaporized to a steam. The design of the heat exchanger 10 of the present embodiment will be hereinafter described in detail.

From the above, one end of the turbine generator 30 is communicated with the outlet O2 of the second guiding channel C2 (the other end of the turbine generator 30 is communicated with the inlet I2 of the second guiding channel C2). The vaporization of the second heat-exchange fluid F2 is suitable for driving the turbine generator 30 to produces the electric power. The battery 50 is connected to the turbine generator 30, and used to store the electric power. In addition, in the present embodiment, the other end of the turbine generator 30 is communicated with the inlet I2 of the second guiding channel C2. The vaporization of the second heat-exchange fluid F2 will be condensed into liquid again after driving the turbine generator 30. The liquid state of the second heat-exchange fluid F2 is driven to flow toward the inlet I2 of the second guiding channel C2, and performs the heat-exchange process again cyclically.

In addition, the solar power system 1 of the present embodiment further includes a first heat-exchange fluid tank 60, wherein the first heat-exchange fluid tank 60 has a first heat-exchange fluid tank-inlet 62 and a first heat-exchange fluid tank-outlet 64. The first heat-exchange fluid tank-inlet 62 is communicated with the outlet O1 of the first guiding channel C1. The first heat-exchange fluid tank-outlet 64 is communicated with the inlet I1 of the first guiding channel C1. The first heat-exchange fluid F1 completed the heat-exchange process of the heat exchanger 10 is stored to the first heat-exchange fluid tank 60 through the first heat-exchange fluid tank-inlet 62. The temperature of the first heat-exchange fluid F1 completed the heat-exchange process is, for example, about 500 degrees Celsius. The solar power system 1 further includes a control valve 70 disposed between the outlet O1 of the first guiding channel C1 and the first heat-exchange fluid tank 60. The turbine generator 30 can control an open state and a close state of the control valve 70, and further controls the flow of the first heat-exchange fluid F1.

Worth mentioning is that the solar power system 1 of the present embodiment not only perform the power generation process under sunlight, but also can perform the power generation process without sunlight. In detail, the temperature of the first heat-exchange fluid F1 is, for example, about 500 degrees Celsius when the heat-exchange process is completed. The temperature of the first heat-exchange fluid F1 still keeps in a high temperature state (higher than 200 degrees Celsius) when the first heat-exchange fluid F1 is stored in the first heat-exchange fluid tank 60 for sometime. Without sunlight, the present embodiment can apply the first heat-exchange fluid F1 to keep in the high temperature state to perform the heat-exchange process. The high temperature state of the first heat-exchange fluid F1 makes the second heat-exchange fluid F2 steam to produce the above mechanical energy. That is, the solar power system 1 of the invention can operate in any weather, and has not influence in a cloudy day or at night.

In addition, the solar power system 1 of the present embodiment also includes a second heat-exchange fluid tank 80 and a flow-detecting controller 90 adapted to detect the flow of the second heat-exchange fluid F2. The second heat-exchange fluid tank 80 is used to store the second heat-exchange fluid F2, and disposed between the turbine generator 30 and the inlet I2 of the second guiding channel C2. Since the second heat-exchange fluid F2 is prone to consume in the process of vaporization or in the process of driving the turbine generator 30 to produce the mechanical energy, the present embodiment applies the flow-detecting controller 90 to monitor the flow of the second heat-exchange fluid F2 and performs a follow-up supplement. In detail, the flow-detecting controller 90 controls the second heat-exchange fluid tank 80 to be the open state to process a supplement when the flow of the second heat-exchange fluid F2 is lower than a default value. The flow-detecting controller 90 is constituted of a control unit 92 and a flow control valve 94, for example. The control unit 92 is used to control the second heat-exchange fluid tank 80 to be an open state or a close state. In addition, about the flow of the first heat-exchange fluid F1 and the second heat-exchange fluid F2, the present embodiment can apply a pump to drive the first heat-exchange fluid F1 and the second heat-exchange fluid F2 to flow, and make the first heat-exchange fluid F1 and the second heat-exchange fluid F2 circulate in the solar power system 1 constantly.

Above description is for the connection between the various components of the solar power system 1 of the invention. Next, the design of the heat exchanger in the solar power system 1 of the invention will be illustrated, and the description of how to own a good heat-exchange efficiency to make the solar power system 1 of the invention has a good photo-electric conversion efficiency is also illustrated.

Figure 2A:
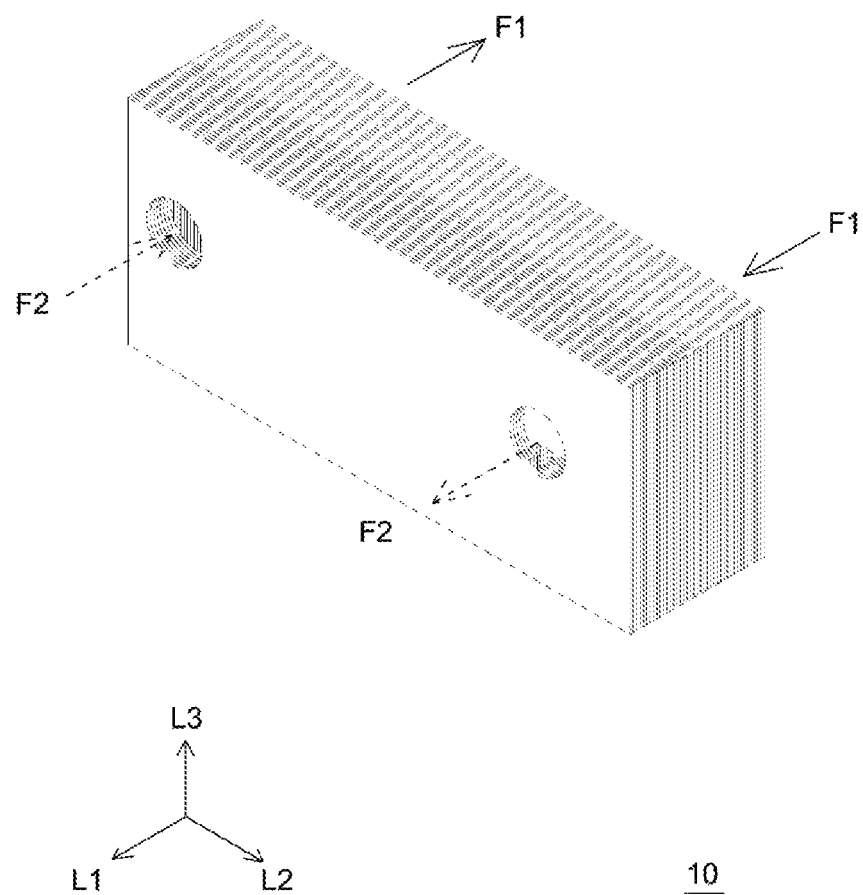
FIG. 2A is a schematic view illustrating another heat exchanger according to one embodiment of the present invention.
Figure 2B:
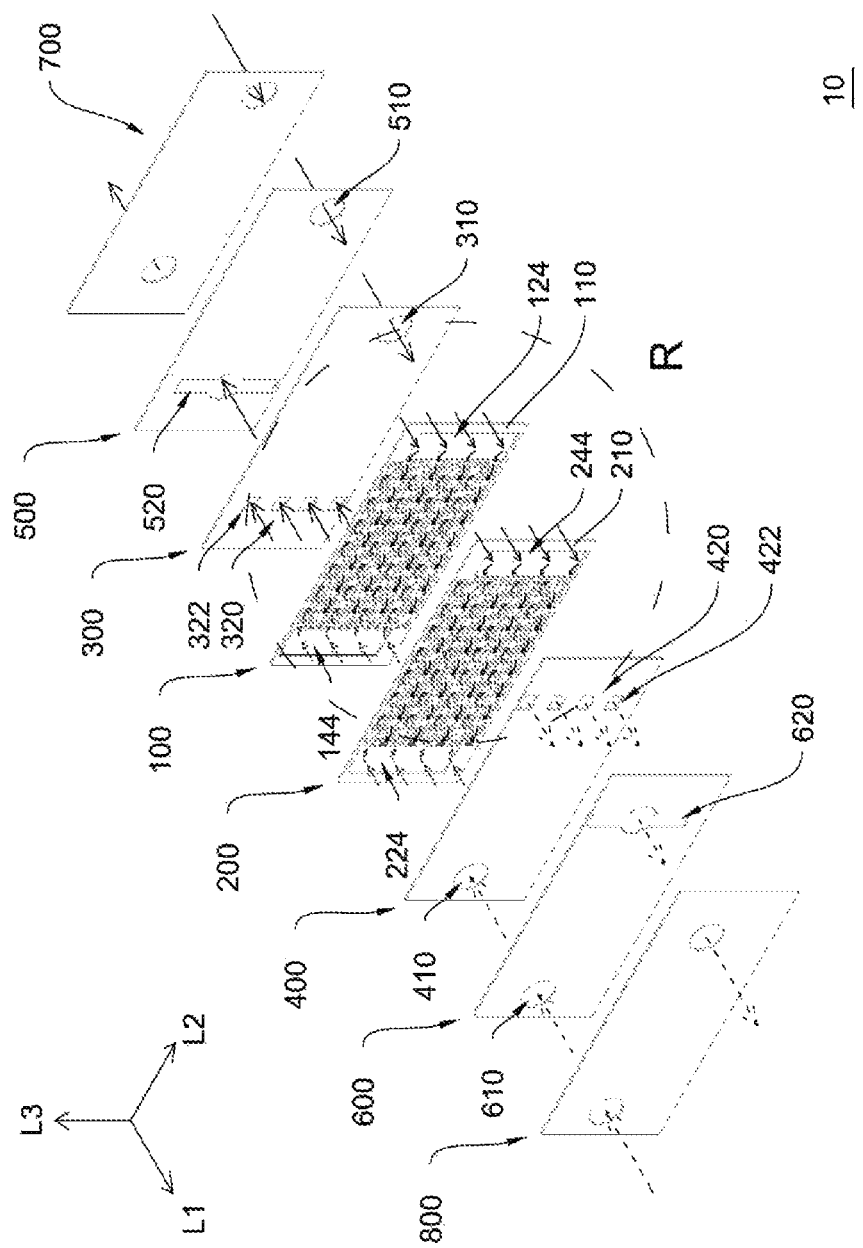
FIG. 2B is an exploded view illustrating the heat exchanger depicted in FIG. 2A.
Figure 2C:
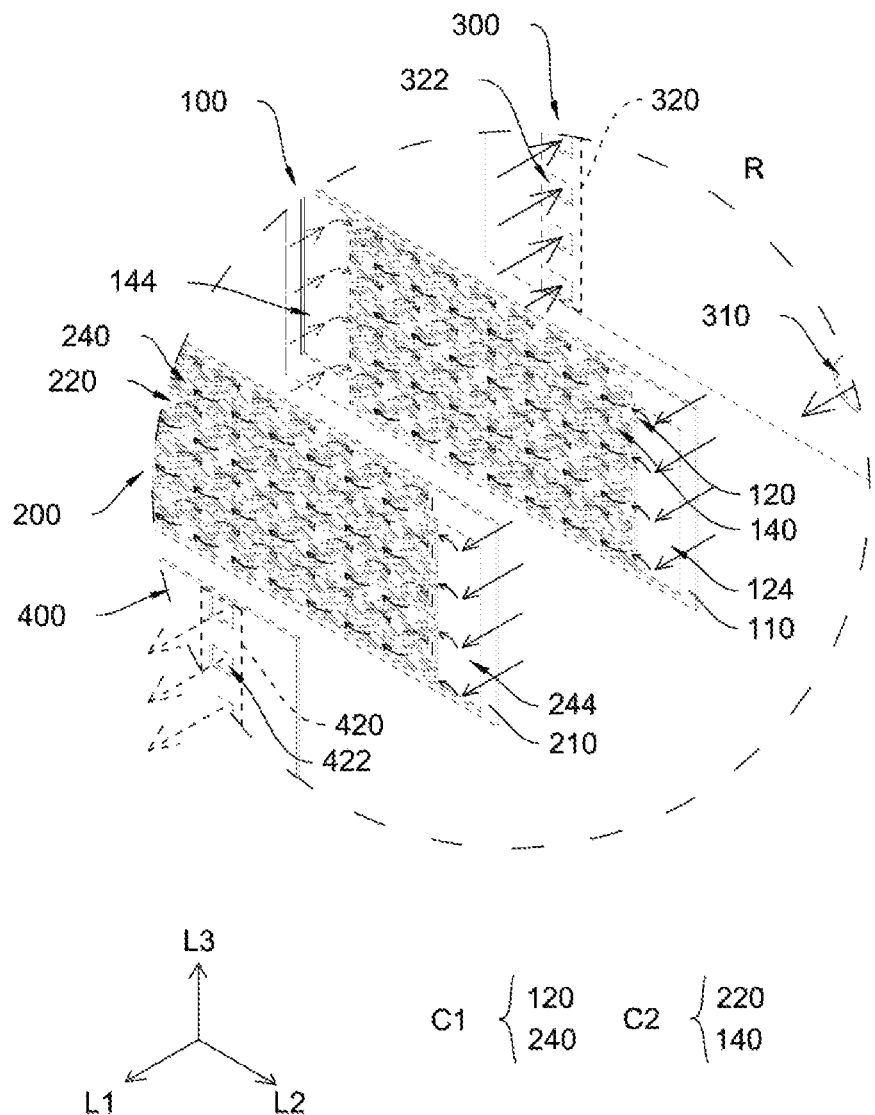
FIG. 2C is an enlarged schematic view illustrating a region of R depicted in FIG. 2B.
Figure 2D:
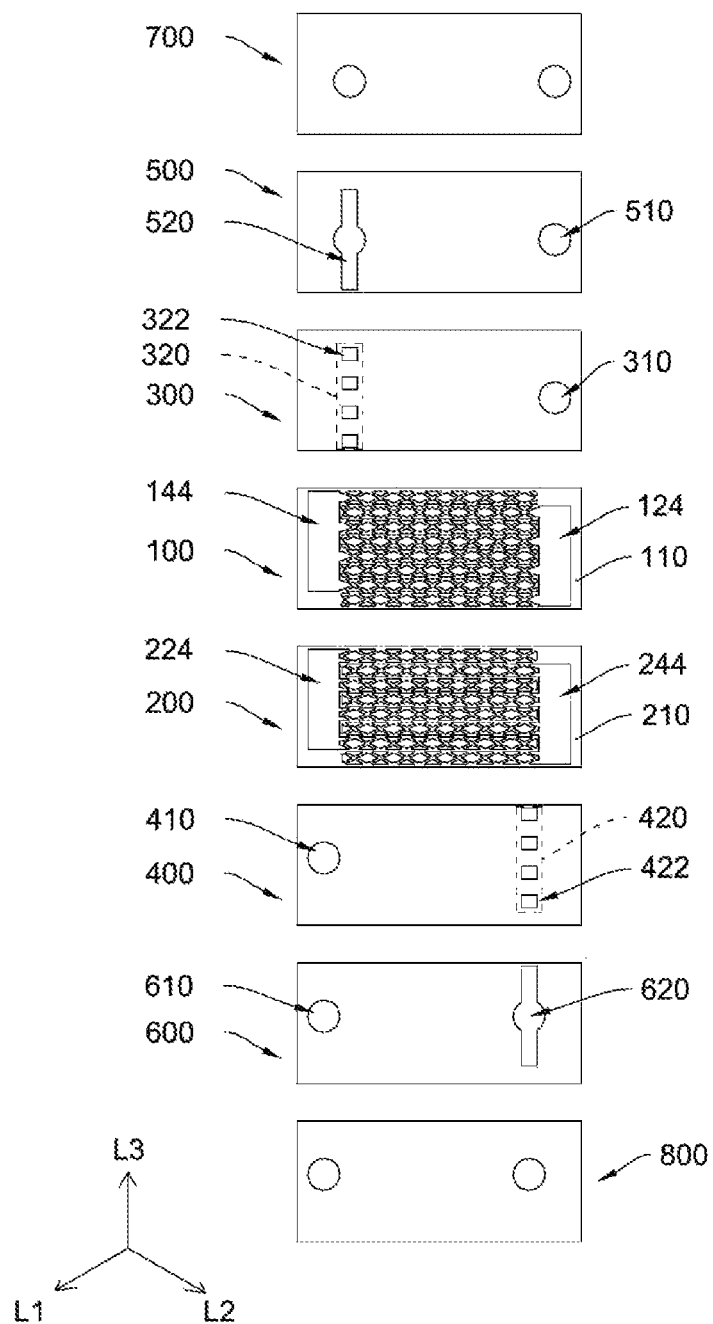
FIG. 2D is a plane schematic view illustrating the heat exchanger depicted in FIG. 2B.
Figure 2E:
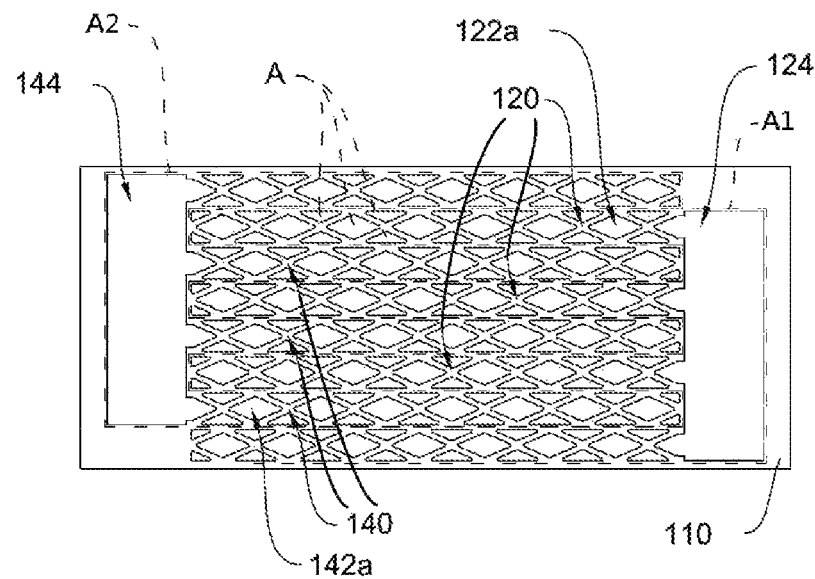
FIG. 2E is an enlarged schematic view illustrating the first fin depicted in FIG. 2D.
Figure 2E:
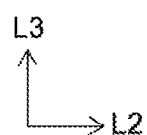
Figure 2F:
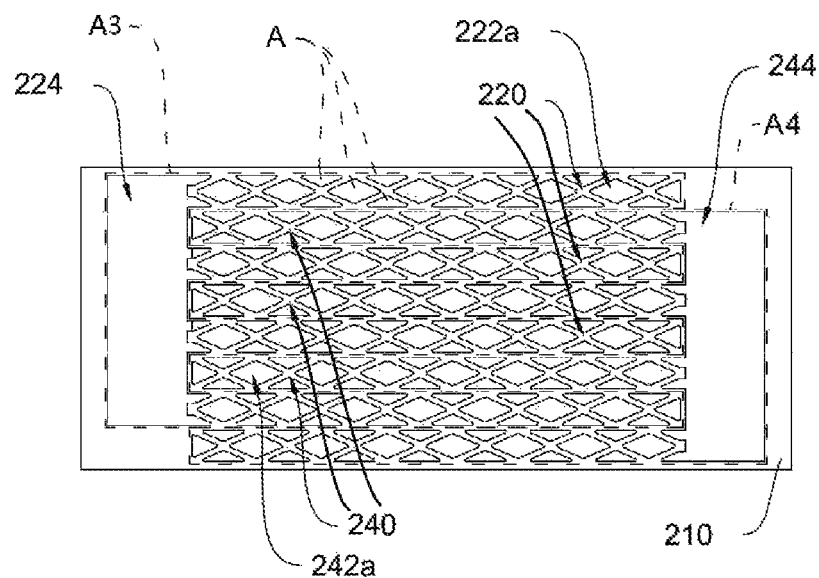
FIG. 2F is an enlarged schematic view illustrating the second fin depicted in FIG. 2D.
Figure 2F:
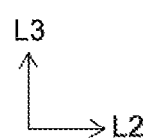
Figure 2G:
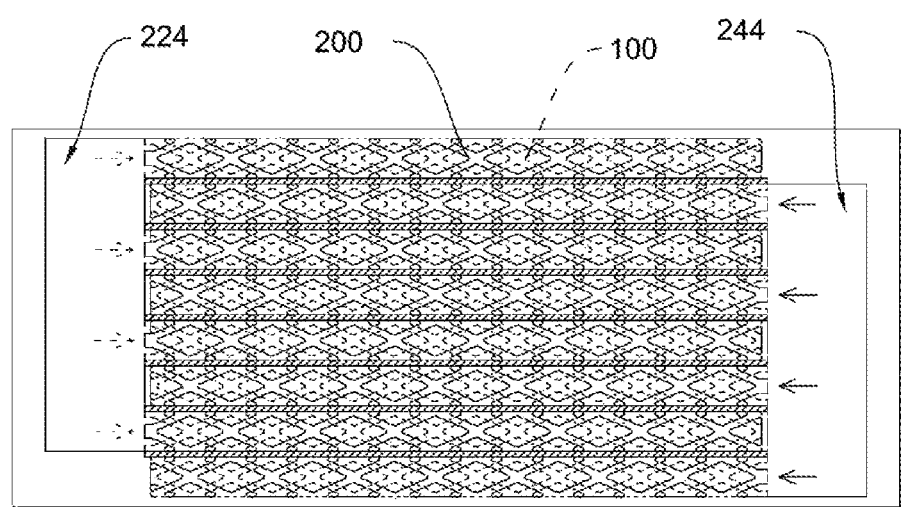
FIG. 2G is a schematic view illustrating a stack of the first fin depicted in FIG. 2E and the second fin depicted in FIG. 2F.
Figure 2G:
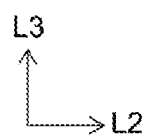

FIG. 2A is a schematic view illustrating another heat exchanger according to one embodiment of the present invention. FIG. 2B is an exploded view illustrating the heat exchanger depicted in FIG. 2A. FIG. 2C is an enlarged schematic view illustrating a region of R depicted in FIG. 2B. FIG. 2D is a plane schematic view illustrating the heat exchanger depicted in FIG. 2B. FIG. 2E is an enlarged schematic view illustrating the first fin depicted in FIG. 2D. FIG. 2F is an enlarged schematic view illustrating the second fin depicted in FIG. 2D. FIG. 2G is a schematic view illustrating a stack of the first fin depicted in FIG. 2E and the second fin depicted in FIG. 2F. Referring to FIG. 2A, FIG. 2B, FIG. 2C, FIG. 2D, FIG. 2E, FIG. 2F, and FIG. 2G, the heat exchanger 10 of the present embodiment includes a first fin 100, a second fin 200, a third fin 300, a fourth fin 400, a fifth fin 500, and a sixth fin 600. The first fin 100, the second fin 200, the third fin 300, the fourth fin 400, the fifth fin 500, and sixth fin 600 are, for example, rectangular sheets, and contacted along a assembly axis L1.

The third fin 300 and the fourth fin 400 are disposed in two sides of the assembly of the first fin 100 and the second fin 200 along the assembly axis L1 respectively, and the fifth fin 500 and the sixth fin 600 are disposed in two sides of the assembly of the first fin 100, the second fin 200, the third fin 300, and the fourth fin 400 along the assembly axis L1 respectively. In the present embodiment, the second fin 200 is, for example, an inverted state of the first fin 100. The inverted state is, for example, the state of the rotating 180 degrees of the first fin 100 along the assembly axis L1. The second fin 200 also be other inverted state of the first fin 100, including but not limited to this type. In addition, the fourth fin 400 is, for example, an inverted state of the third fin 300, and the sixth fin 600 is, for example, an inverted state of the fifth fin 500.

The heat exchanger 10 of the present embodiment is constituted of at least a first fin 100 and at least a second fin 200 mainly, and the first fin 100 and the second fin 200 will be illustrated in detail as follow. The first fin 100 has a first body 110, multiple first heat-exchange structures 120, and multiple first connecting structures 140, wherein the first heat-exchange structures 120 and the first connecting structures 140 are configured with interval in the first body 110 along a disposing axis L3. Each first heat-exchange structure 120 has multiple first heat-exchange units 122a arranged in the first body 110 along a connecting axis L2, and each first connecting structure 140 has multiple first connecting units 142a arranged in the first body 110 along the connecting axis L2. Wherein, the first heat-exchange units 122a and the first connecting units 142a are, for example, groove units.

Each second fin 200 has a second body 210, multiple second heat-exchange structures 220, and multiple second connecting structures 240, wherein the second heat-exchange structures 220 and the second connecting structures 240 are configured with interval in the second body 210 along the disposing axis L3. Each second heat-exchange structure 220 has multiple second heat-exchange unit 222a arranged in the second body 210 along the connecting axis L2, and each second connecting structure 242 has multiple second connecting units 242a arranged in the second body 210 along the connecting axis L2. Wherein, the second heat-exchange units 222a and the second connecting units 242a are, for example, groove units.

In the heat exchanger 10 of the present embodiment, the connecting unit or the heat-exchange unit is, for example, diamond type structure. That is, the first heat-exchange unit 122a, the second heat-exchange unit 222a, the first connecting unit 142a, and the second connecting unit 242a are, for example, diamond type structures. The connecting unit or the heat-exchange unit of the present embodiment can be a circular type structure or a triangular type structure, the present invention does not have any limitation.

From the above, the first fin 100 also includes a first mainstream channel 124 and a second mainstream channel 144. Each first heat-exchange structure 120 is, for example, a tributary channel. The tributary channels constituted of the first heat-exchange structures 120 are connected with the first mainstream channel 124 along the connecting axis L2. Each first connecting structure 140 is, for example, a tributary channel, the tributary channels constituted of the first connecting structures 140 are connected with the second mainstream channel 144 along the connecting axis L2.

Similarly, the second fin 200 further includes a third mainstream channel 224 and a fourth mainstream channel 244. Each second heat-exchange structure 220 is, for example, a tributary channel. The tributary channels constituted of the second heat-exchange structures 220 are connected with the third mainstream channel 224 along the connecting axis L2. Each second connecting structure 240 is, for example, a tributary channel. The tributary channels constituted of the second connecting structures 240 are connected with the fourth mainstream channel 244 along the connecting axis L2.

The assembly A1 of the first heat-exchange structures 120 and the first mainstream channel 124, the assembly A2 of the first connecting structures 140 and the second mainstream channel 144, the assembly A3 of the second heat-exchange structures 220 and the third mainstream channel 224, the assembly A4 of the second connecting structures 240 and the fourth mainstream channel 244 are, for example, similar to the "claw" type structure or the "E" type structure. The assembly A1 of the first heat-exchange structures 120 and the first mainstream channel 124 and the assembly A2 of the first connecting structures 140 and the second mainstream channel 144 are embedded with each other in first body 110. The assembly A3 of the second heat-exchange structures 220 and the third mainstream channel 224 and the assembly A4 of the second connecting structures 240 and the fourth mainstream channel 244 are embedded with each other in the second body 210. That is, in the first body 110, one first heat-exchange structure 120 is disposed between two first connecting structures 140, and one first connecting structure 140 is disposed between two first heat-exchange structures 120. Similarly, in the second body 210, one second heat-exchange structures 220 is disposed between two second connecting structure 240, and one second connecting structure 240 is disposed between two second heat-exchange structures 220.

When the first fin 100, the second fin 200, the third fin 300, the fourth fin 400, the fifth fin 500, and the sixth fin 600 are contacted along the assembly axis L1, the projection area of the second connecting structure 240 in first body 110 is overlapped with the first heat-exchange structure 120, and the projection area of the first connecting structure 140 in the second body 210 is overlapped with the second heat-exchange structure 220. Further, the first mainstream channel 124 and the fourth mainstream channel 244 are communicated with each other, and the third mainstream channel 224 and the second mainstream channel 144 are communicated with each other. That is, the second connecting structures 240 are adapt to communicate with the first heat-exchange structure 120, and the first connecting structures 140 are adapt to communicate with the second heat-exchange structure 220.

Besides, because of the first fin 100 having multiple first heat-exchange structures 120 arranged in the first body 110 along the disposing axis L3 and each first heat-exchange structure 120 having multiple first heat-exchange units 122a arranged in the first body 110 along the connecting axis L2, one end of the second connecting unit 242a of the second fin 200 is overlapped with one end of the first heat-exchange unit 122a of the adjacent first fin 100. The other end of the second connecting unit 242a is overlapped with one end of another first heat-exchange unit 122a of the first fin 100.

Similarly, because of the second fin 200 having multiple second heat-exchange structure 220 arranged in the second body 210 along the disposing axis L3 and each second heat-exchange structure 220 having multiple second heat-exchange units 222a arranged in the second body 210 along the connecting axis L2, one end of the first connecting unit 142a of the first fin 100 is overlapped with one end of the second heat-exchange unit 222a of the adjacent second fin 200. The other end of the first connecting unit 142a is overlapped with one end of another second heat-exchange unit 222a of the second fin 200. The two first heat-exchange units 122a overlapped with the second connecting unit 242a are arranged in the first body 110 along the connecting axis L2 adjacently. The two second heat-exchange units 222a overlapped with the first connecting unit 142a are arranged in the second body 210 along the connecting axis L2 adjacently.

As a result, the first guiding channel C1 is constituted of the first heat-exchange structure 120 and the second connecting structure 240, and the second guiding channel C2 is constituted of the second heat-exchange structure 220 and the first connecting structure 140. The assembly axis L1, the disposing axis L3, and the connecting axis L2 are, for example, vertical to each other.

In addition, in the present embodiment, the first guiding channel C1 is, for example, capable of flowing for the first heat-exchange fluid F1 with higher temperature, and the second guiding channel C2 is, for example, capable of flowing for the second heat-exchange fluid F2 with lower temperature. The first guiding channel C1 is, for example, a 「⊔」 type guiding channel. The second guiding channel C2 is, for example, a 「⊓」 type guiding channel. The across area of the first guiding channel C1 is, for example, across the cross-section of the heat exchanger 10. Similarly, the across area of the second guiding channel C2 also is, for example, across the cross-section of the heat exchanger 10. That is, the across area of the first guiding channel C1 and the across area of the second guiding channel C2 are similar substantially. Therefore, the first heat-exchange fluid F1 and the second heat-exchange fluid F2 can perform the heat-exchange process effectively by flowing across the heat exchanger 10 completely.

In the present embodiment, multiple heat-exchange units or connecting units arranged along the connecting axis L2 can be defined to a unit arrangement. One heat-exchange structure or one connecting structure is constituted of multiple adjacent unit arrangements A staggered with each other. That is, the first heat-exchange unit 122a of each first heat-exchange structure 120 is staggered with the adjacent first heat-exchange unit 122a, the first connecting unit 142a of each first connecting structure 140 is staggered with the adjacent first connecting unit 142a, the second heat-exchange unit 222a of each second heat-exchange structure 220 is staggered with the adjacent second heat-exchange unit 222a, and the second connecting unit 242a of each second connecting structure 242 is staggered with the adjacent second connecting unit 242a.

Therefore, when the first fin 100 and the second fin 200 are contacted along the assembly axis L1, the second connecting unit 242a of the second fin 200 is communicated with two adjacent first heat-exchange units 122a arranged along the disposing axis L3 and two adjacent first heat-exchange units 122a arranged along the connecting axis L2 in the first fin 100, the first connecting unit 142a of the first fin 100 is communicated with two adjacent second heat-exchange units 222a arranged along the disposing axis L3 and two adjacent second heat-exchange units 222a arranged along the connecting axis L2 in the second fin 200. That is, one second connecting unit 242a is communicated with four adjacent first heat-exchange units 122a of the first fin 100, and one first connecting unit 142a is communicated with four adjacent second heat-exchange units 222a of the second fin 200. Although the above illustration take one connecting unit communicated with adjacent four heat-exchange units for example, but the design of one connecting unit communicated with adjacent four heat-exchange units are all within the spirit and scope of this invention, including but not limited to this type.

From the above, the present embodiment also has better heat-exchange efficiency by the design of one connecting unit communicated with multiple adjacent heat-exchange units and frequent flow separation. The design of each heat-exchange structure constituted of multiple heat-exchange units and each connecting structure constituted of multiple connecting units further increases the heat-exchange area between the heat-exchange fluid and the fin substantially, and upgrades the heat-exchange efficiency of the heat exchanger 10. In addition, because the heat-exchange units and the connecting units are, for example, groove units and one end of the two connected groove units (one heat-exchange unit and one connecting unit) overlapped with each other partially in the present embodiment, the heat-exchange fluid flowed to the connecting unit or the heat-exchange unit will be separated or confluent continuously by the groove wall as described in above embodiment. Therefore, in the process of the heat-exchange fluid flowing through the heat exchanger 10, there will be a largest contact area between each fin and the heat-exchange fluid, and the heat exchanger 10 can perform the heat-exchange process in each connecting unit or heat-exchange unit with the heat-exchange fluid, and make the heat exchanger 10 have a good heat-exchange efficiency.

Worth mentioning is that the groove units of the present embodiment are, for example, a diamond type structure. The inner wall of the groove unit has at least a slope structure, so that the heat-exchange fluid will separated toward multiple directions after the heat-exchange fluid colliding with the end of the groove unit. There will be produced a serious turbulence to make the heat-exchange fluid in one section perform the heat-exchange stably.

Afterwards, other fins of the present embodiment will be illustrated as follow. The third fin 300 of the present embodiment has a first inlet structure 310 and a first outlet structure 320, and the fourth fin 400 has a second inlet structure 410 and a second the outlet structure 420. The first inlet structure 310 and the first outlet structure 320 are connected to two ends of the first guiding channel C1, and the second inlet structure 410 and the second outlet structure 420 are connected to two ends of the second guiding channel C2. The first outlet structure 320 of the third fin 300 is, for example, constituted of multiple first outlet units 322 arranged along the disposing axis L3. The second outlet structure 420 is, for example, constituted of multiple second outlet unit 422 arranged along the disposing axis L3. The projection area of the first outlet units 322 in first body 110 is overlapped with one end of the first heat-exchange structure 120, and the projection area of the second outlet unit 422 in the second body 210 is overlapped with one end of the second heat-exchange structure 220. The projection area of the first inlet structure 310 and the first outlet structure 320 of the third fin 300 in the fourth fin 400 is not overlapped with the second inlet structure 410 and the second outlet structure 420.

Therefore, when the third fin 300 and the fourth fin 400 are disposed in two sides of the assembly of the first fin 100 and the second fin 200 along the assembly axis L1 respectively, the first outlet units 322 and the first heat-exchange structure 120 are communicated with each other, and the second outlet units 422 and the second heat-exchange structure 220 are communicated with each other. That is, the first outlet structure 320 is communicated with the first heat-exchange structure 120, and the second outlet structure 420 is communicated with the second heat-exchange structure 220. In addition, in the present embodiment, the first inlet structure 310 is communicated with the first heat-exchange structure 120, and the second inlet structure 410 is communicated with the second heat-exchange structure 220. The first outlet structure 320 of the third fin 300 is, for example, constituted of multiple first the outlet units 322 arranged along the disposing axis L3. The second outlet structure 420 is, for example, constituted of multiple second outlet units 422 arranged along the disposing axis L3. The design can increase the heat-exchange area between the heat-exchange fluid and the fin.

In addition, the fifth fin 500 has a first through hole 510 and a second through hole 520, the sixth fin 600 has a third through hole 610 and a fourth through hole 620, one side of the first inlet structure 310 is communicated with one end of the first heat-exchange structure 120, another side of the first inlet structure 310 is communicated with the first through hole 510, one side of the first outlet structure 320 is communicated with another end of the first heat-exchange structure 120, another side of the first outlet structure 320 is communicated with the second through hole 520, one side of the second inlet structure 410 is communicated with one end of the second heat-exchange structure 220, another side of the second inlet structure 410 is communicated with the third through hole 610, one side of the second outlet structure 420 is communicated with another end of the second heat-exchange structure 220, another side of the second outlet structure 420 is communicated with the fourth through hole 620.

As a result, the first heat-exchange fluid F1 with higher temperature can flow into the first guiding channel C1 through the first through hole 510 and the first inlet structure 310, and flow out of the heat exchanger 10 through the first outlet structure 320 and the second through hole 520 after flowing out of the first guiding channel C1. On the other hand, the second heat-exchange fluid F2 with lower temperature can flow into the second guiding channel C2 through the third through hole 610 and the second inlet structure 410, and flow out of the heat exchanger 10 through the second outlet structure 420 and fourth through hole 620 after flowing out of the second guiding channel C2. By the above connection, the heat-exchange process can be performed between the first heat-exchange fluid F1 with higher temperature and the second heat-exchange fluid F2 with lower temperature of the heat exchanger 10. The heat exchanger 10 of the present embodiment further includes a seventh fin 700 and a eighth fin 800. The seventh fin 700 and the eighth fin 800 are disposed in two sides of the assembly of the first fin 100, the second fin 200, the third fin 300, the fourth fin 400, the fifth fin 500, and sixth fin 600 along the assembly axis L1, and the heat-exchange fluids can flow into or out of the heat exchanger 10 through a opening disposed in the seventh fin 700 or the eighth fin 800.

The present embodiment takes the stagger of a first fin 100 and a second fin 200 along the assembly axis L1 mainly. In other embodiments, multiple first fins 100 can be assembled in advance, and multiple second fins 200 can be assembled in advance. And then, the assembly of the first fins 100 and the assembly of the second fins 200 can be staggered to constitute another heat exchanger. About the staggered method of the assembly of the first fins 100 and the second fins 200, the present invention does not have any limitation. In addition, the present embodiment is constituted of at least a first fin 100 and at least a second fin 200 mainly, the assembled type of the third fin 300, the fourth fin 400, the fifth fin 500, the sixth fin 600, the seventh fin 700, and the eighth fin 800 opposite to the location of the first fin 100 and the second fin 200 as described in above is one of various embodiments. It is within the scope and spirit of the present invention as long as the appropriate disposing type for the first guiding channel C1 and the second guiding channel C2 flowing smoothly, and the present invention does not have any limitation.

The heat exchanger 10 of the present invention has a good heat-exchange efficiency, and make the solar power system 1 of the invention upgrade the photo-electric conversion efficiency of the solar power system 1 efficiently and substantially.

To sum up, in the solar power system of the invention, at least two fins are set with multiple heat-exchange structures and connecting structures in the heat exchanger respectively. In each fin, the heat-exchange structure is not communicated with the connecting structure, and one heat-exchange unit is not communicated with another heat-exchange unit. When the fins are assembled, the heat-exchange unit of one fin is communicated with the adjacent heat-exchange unit through one connecting unit of another fin. The heat-exchange structures are disposed in heat exchanger densely by various arrangements, further have a guiding channel with a good heat-exchange efficiency. Thus, the heat exchanger of the invention has two guiding channels to perform the heat-exchange process for the fluids with different temperatures.

In addition, since the heat exchanger of the invention is assembled by at least two types of fins staggered with each other and each fin has multiple heat-exchange structures and connecting structures, the heat-exchange fluid is forced to be confluent or separated constantly when The heat-exchange fluid flows into the heat exchanger. This increases the contact area between the heat-exchange fluid and heat exchanger substantially, and increases the rate of the heat-exchange process of heat-exchange fluids to achieve good heat-exchange performance. Therefore, the second heat-exchange fluid is, for example, water. The first heat-exchange fluid is, for example, oil. The second heat-exchange fluid can be vaporized into steam rapidly and efficiently when the first heat-exchange fluid is heated via sunlight by the heat exchanger of the invention. In the working process of the turbine generator communicated with the outlet of the second guiding channel, the steam is applied to drive the turbine generator to produce a mechanical energy rapidly and efficiently, and the mechanical energy can be transformed to an electric power. Therefore, the photo-electric conversion efficiency of the solar power system is upgraded substantially.

Furthermore, the solar power system of the invention not only performs the power generation process under sunlight, but also can perform the power generation process without sunlight. Without sunlight, the invention can make the first heat-exchange fluid stored in the first heated-exchange fluid tank keep in the high temperature state to perform the heat-exchange process. The high temperature state of the first heat-exchange fluid makes the second heat-exchange fluid steam to produce the above mechanical energy.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A solar power system, suitable for converting sunlight to an electric power, comprising:
   a heat exchanger, including at least one first fin and at least one second fin,
   wherein the at least one first fin has a first body, multiple first heat-exchange structures, and multiple first connecting structures, the multiple first heat-exchange structures and the multiple first connecting structures are configured with interval in the first body along a disposing axis, each first heat-exchange structure has multiple first heat-exchange units arranged in the first body along a connecting axis, each first connecting structure has multiple first connecting units arranged in the first body along the connecting axis;
   wherein the at least one second fin has a second body, multiple second heat-exchange structures and multiple second connecting structures, the multiple second heat-exchange structures and the multiple second connecting structures are configured with interval in the second body along the disposing axis, each second heat-exchange structure has multiple second heat-exchange units arranged in the second body along the connecting axis, each second connecting structure has multiple second connecting units arranged in the second body along the connecting axis;
   wherein the at least one first fin and the at least one second fin are connected along a assembly axis, the second connecting units are communicated with the multiple first heat-exchange units, the first connecting units are communicated with the multiple second heat-exchange units;
   wherein the first heat-exchange unit of each first heat-exchange structure is staggered with an adjacent first heat-exchange unit, the first connecting unit of each first connecting structure is staggered with an adjacent connecting unit, the second heat-exchange unit of each second heat-exchange structure is staggered with an adjacent second heat-exchange unit, the second connecting unit of each second connecting structure is staggered with an adjacent second connecting unit;
   wherein the multiple first heat-exchange structures and the multiple second connecting structures constitute a first guiding channel, the multiple second heat-exchange structures and the multiple first connecting structures constitute a second guiding channel;
   wherein a first heat-exchange fluid flows in the first guiding channel, a second heat-exchange fluid flows in the second guiding channel;
   wherein, the multiple first heat-exchange units are arranged adjacently without communicating, and the first connecting units are arranged adjacently without communicating;
   wherein, when the at least one first fin and the at least one second fin are contacted along the assembly axis, the multiple first heat-exchange units are communicated by the second connecting units,
   wherein, the multiple second heat-exchange units are arranged adjacently without communicating, the second connecting units are arranged adjacently without communicating;
   wherein, when the at least one first fin and the at least one second fin are contacted along the assembly axis, the multiple second heat-exchange units are communicated by the first connecting units,
   wherein, the multiple first heat-exchange units are groove units, the multiple first connecting units are groove units, the multiple second heat-exchange units are groove units, the multiple second connecting units are groove units,
   wherein, one end of the second connecting unit of the at least one second fin is overlapped with one end of the first heat-exchange unit of the adjacent first fin, the other end of the second connecting unit is overlapped with one end of another first heat-exchange unit of the at least one first fin, one end of the first connecting unit of the at least one first fin is overlapped with one end of the second heat-exchange unit of the adjacent second fin, the other end of the first connecting unit is overlapped with one end of another second heat-exchange unit of the at least one second fin,
   wherein, two first heat-exchange units overlapped with the second connecting unit are arranged in the first body along the connecting axis, and two second heat-exchange units overlapped with the first connecting unit are arranged in the second body along the connecting axis,
   wherein, the at least one first fin further includes a first mainstream channel and a second mainstream channel, and the at least one second fin further includes a third mainstream channel and a fourth mainstream channel,
   wherein, each first heat-exchange structure constitutes to a tributary channel connected with the first mainstream channel along the connecting axis, and each first connecting structure constitutes to another tributary channel connected with the second mainstream channel along the connecting axis;

wherein, each second heat-exchange structure constitutes to another tributary channel connected with the third mainstream channel along the connecting axis, and each second connecting structure constitutes to another tributary channel connected with the fourth mainstream channel along the connecting axis;

wherein, the first mainstream channel and the fourth mainstream channel are communicated with each other, the third mainstream channel and the second mainstream channel are communicated with each other, a heat-focusing mirror, receiving sunlight and focusing to the first heat-exchange fluid in the first guiding channel by light reflection or refraction;

a turbine generator, one end of the turbine generator is communicated with an outlet of the second guiding channel, and the second heat-exchange fluid is driving the turbine generator to produce an electric power; and a battery, connected to the turbine generator, and the electric power is stored in the battery.

2. The solar power system as recited in claim 1, wherein the second connecting unit of the at least one second fin is communicated with two adjacent first heat-exchange units of the at least one first fin arranged along the disposing axis and two adjacent first heat-exchange units arranged along the connecting axis, the first connecting unit of the at least one first fin is communicated with the two adjacent second heat-exchange units of the at least one second fin arranged along the disposing axis and the two adjacent second heat-exchange units arranged along the connecting axis.

3. The solar power system as recited in claim 1, wherein a projection area of the second connecting structure in the first body is overlapped with the first heat-exchange structure, a projection area of the first connecting structure in the second body is overlapped with the second heat-exchange structure.

4. The solar power system as recited in claim 3, wherein the multiple first heat-exchange structures and the multiple first connecting structures are embedded in the first body, the multiple second heat-exchange structures and the multiple second connecting structures are embedded in the second body.

5. The solar power system as recited in claim 3, wherein the assembly of the multiple first heat-exchange structures and the first mainstream channel and the assembly of the multiple first connecting structures and the second mainstream channel are embedded in the first body, the assembly of the multiple second heat-exchange structures and the third mainstream channel and the assembly of the multiple second connecting structures and the fourth mainstream channel are embedded in the second body.

6. The solar power system as recited in claim 1, wherein the heat exchanger further includes a third fin and a fourth fin, the third fin and the fourth fin are disposed in two sides of the assembly of the at least one first fin and the at least one second fin along the assembly axis respectively, the third fin has a first inlet structure and a first outlet structure, the fourth fin has a second inlet structure and a second the outlet fin structure, the first inlet structure and the first outlet structure are connected to two ends of the first guiding channel, the second inlet structure and the second outlet structure are connected to two ends of the second guiding channel, the first inlet structure is communicated with one end of the first heat-exchange structure, the first outlet structure is communicated with another end of the first heat-exchange structure, the second inlet structure is communicated with one end of the second heat-exchange structure, the second outlet structure is communicated with another end of the second heat-exchange structure.

7. The solar power system as recited in claim 6, further includes a fifth fin and a sixth fin, the fifth fin and the sixth fin are disposed in the two sides of the assembly of the at least one first fin, the at least one second fin, each third fin, and each fourth fin along the assembly axis respectively, the fifth fin has a first through hole and a second through hole, the sixth fin has a third through hole and a fourth through hole, one side of the first inlet structure is communicated with one end of the first heat-exchange structure, another side of the first inlet structure is communicated with the first through hole, one side of the first outlet structure is communicated with another end of the first heat-exchange structure, and another side of the first outlet structure is communicated with the second through hole, one side of the second inlet structure is communicated with one end of the second heat-exchange structure, and another side of the second inlet structure is communicated with the third through hole, one side of the second outlet structure is communicated with another end of the second heat-exchange structure, and another side of the second outlet structure is communicated with the fourth through hole.

8. The solar power system as recited in claim 1, further includes a first heat-exchange fluid tank, a control valve, a second heat-exchange fluid tank, a flow-detecting controller, and a pump, wherein the first heat-exchange fluid is oil, the second heat-exchange fluid is water, the first heat-exchange fluid tank has a first heat-exchange fluid tank-inlet and a first heat-exchange fluid tank-outlet, the first heat-exchange fluid tank-inlet is communicated with the outlet of the first guiding channel, the first heat-exchange fluid tank-outlet is communicated with the inlet of the first guiding channel, the control valve is disposed between the outlet of the first guiding channel and the first heat-exchange fluid tank, the turbine generator is suitable for controlling a open state and a close state of the control valve, the second heat-exchange fluid tank is used to store the second heat-exchange fluid, and disposed between the turbine generator and the inlet of the second guiding channel, the flow-detecting controller is suitable for detecting the flow of the second heat-exchange fluid, when the flow of the second heat-exchange fluid is lower than a default value, the flow-detecting controller controls the second heat-exchange fluid tank to be the open state to process a supplement, the pump is used to drive the first heat-exchange fluid and the second heat-exchange fluid.

9. The solar power system as recited in claim 1, wherein the heat-focusing mirror is a Fresnel solar mirror.

10. The solar power system as recited in claim 1, wherein the turbine generator is a steam turbine generator.

* * * * *